(12) United States Patent
Shigeta et al.

(10) Patent No.: US 8,520,742 B2
(45) Date of Patent: Aug. 27, 2013

(54) MOVING IMAGE COMPRESSION-CODING DEVICE, METHOD OF COMPRESSION-CODING MOVING IMAGE, AND H.264 MOVING IMAGE COMPRESSION-CODING DEVICE

(75) Inventors: Yoshinori Shigeta, Kawasaki (JP); Shunichi Ishiwata, Urayasu (JP); Hiromitsu Nakayama, Kawasaki (JP); Takaya Ogawa, Kawasaki (JP); Shinichiro Koto, Tokyo (JP); Atsushi Matsumura, Yokohama (JP); Shuo Nomura, Madison, WI (US)

(73) Assignee: Kabushiki Kaisha Toshiba, Tokyo (JP)

( * ) Notice: Subject to any disclaimer, the term of this patent is extended or adjusted under 35 U.S.C. 154(b) by 789 days.

(21) Appl. No.: 12/717,995

(22) Filed: Mar. 5, 2010

(65) Prior Publication Data

US 2010/0260256 A1    Oct. 14, 2010

(30) Foreign Application Priority Data

Mar. 6, 2009   (JP) .................................. 2009-53100

(51) Int. Cl.
 *H04N 7/12* (2006.01)
 *H04B 1/66* (2006.01)
(52) U.S. Cl.
 USPC ................................................... 375/240.26
(58) Field of Classification Search
 None
 See application file for complete search history.

(56) References Cited

U.S. PATENT DOCUMENTS

| 5,729,295 | A | * | 3/1998 | Okada | 375/240.13 |
| 5,754,699 | A | * | 5/1998 | Sugahara | 382/233 |
| 5,787,221 | A | * | 7/1998 | Matsumi et al. | 386/338 |
| 6,618,444 | B1 | * | 9/2003 | Haskell et al. | 375/240.24 |
| 7,397,852 | B2 | * | 7/2008 | Sugiyama et al. | 375/240.02 |
| 7,545,533 | B2 | * | 6/2009 | Ok et al. | 358/1.9 |
| 8,311,112 | B2 | * | 11/2012 | Goel | 375/240.13 |
| 2009/0168869 | A1 | | 7/2009 | Melamed et al. | |

FOREIGN PATENT DOCUMENTS

| JP | 2000-078588 | 3/2000 |
| JP | 2001-522174 | 11/2001 |
| JP | 2002-238060 | 8/2002 |
| WO | WO 99/22518 | 5/1999 |

OTHER PUBLICATIONS

Office Action for Japanese Patent Application No. 2009-053100, mailed Jun. 7, 2011, Japanese Patent Office, with English translation (8 pgs.).
H.264/AVC Kyokasho; Sake Okubo et al; Sep. 21, 2004, pp. 105-138, No translation. The whole document appears to be in Japanese.

* cited by examiner

*Primary Examiner* — Nhon Diep
(74) *Attorney, Agent, or Firm* — Sprinkle IP Law Group

(57) ABSTRACT

A moving image compression-coding device has a pixel determination module configured to determine whether a color of each pixel in a macro block having a plurality of pixels in an input image is a predetermined color, a pixel counter configured to count a number of the pixels having the predetermined color in the macro block, a macro block determination module configured to determine whether a color of the macro block is considered to be the predetermined color according to the count result, and a compression-coded data generator configured to compression-code the input image with a compression ratio depending on the determination result.

9 Claims, 6 Drawing Sheets

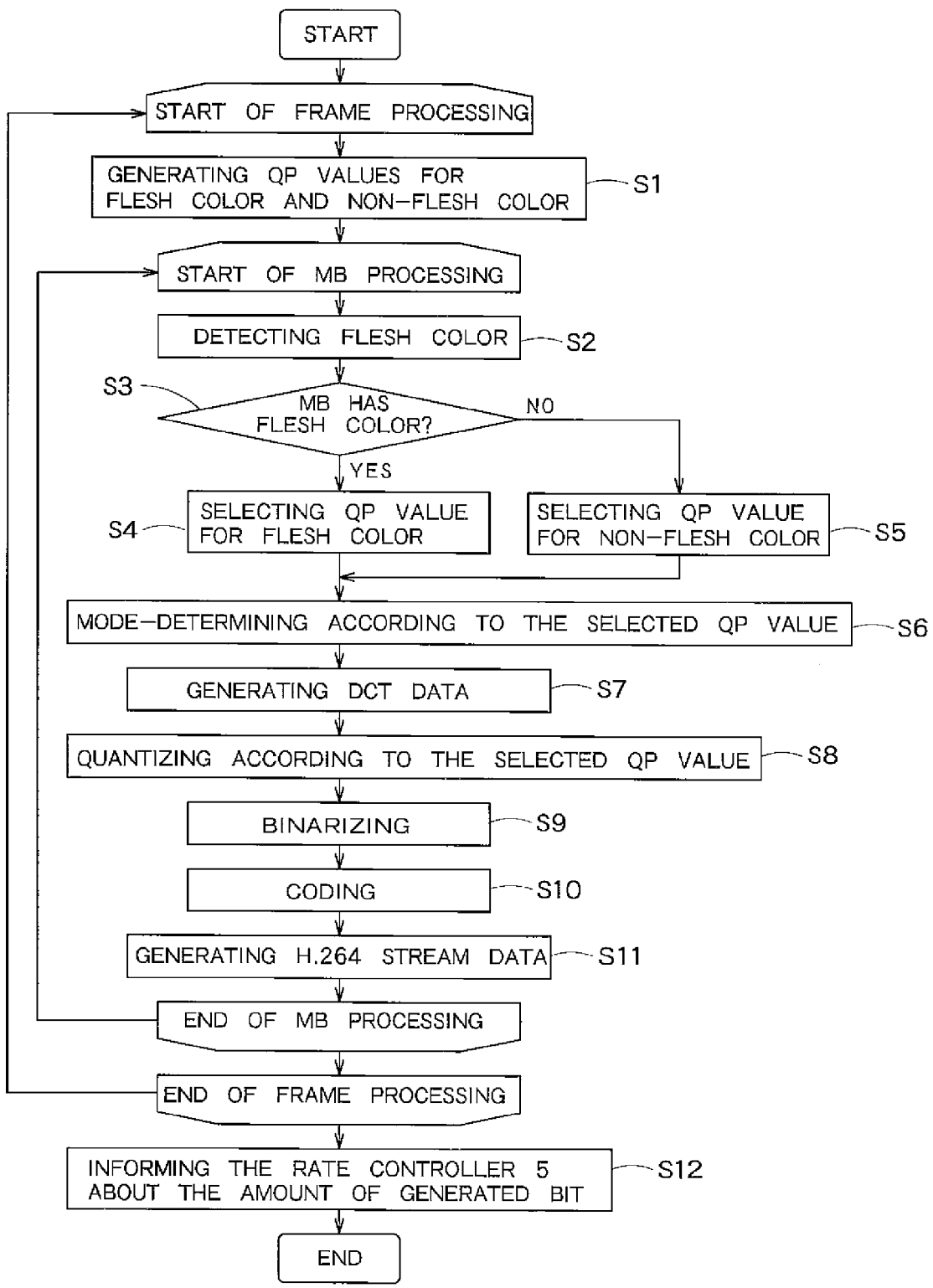
F I G. 2

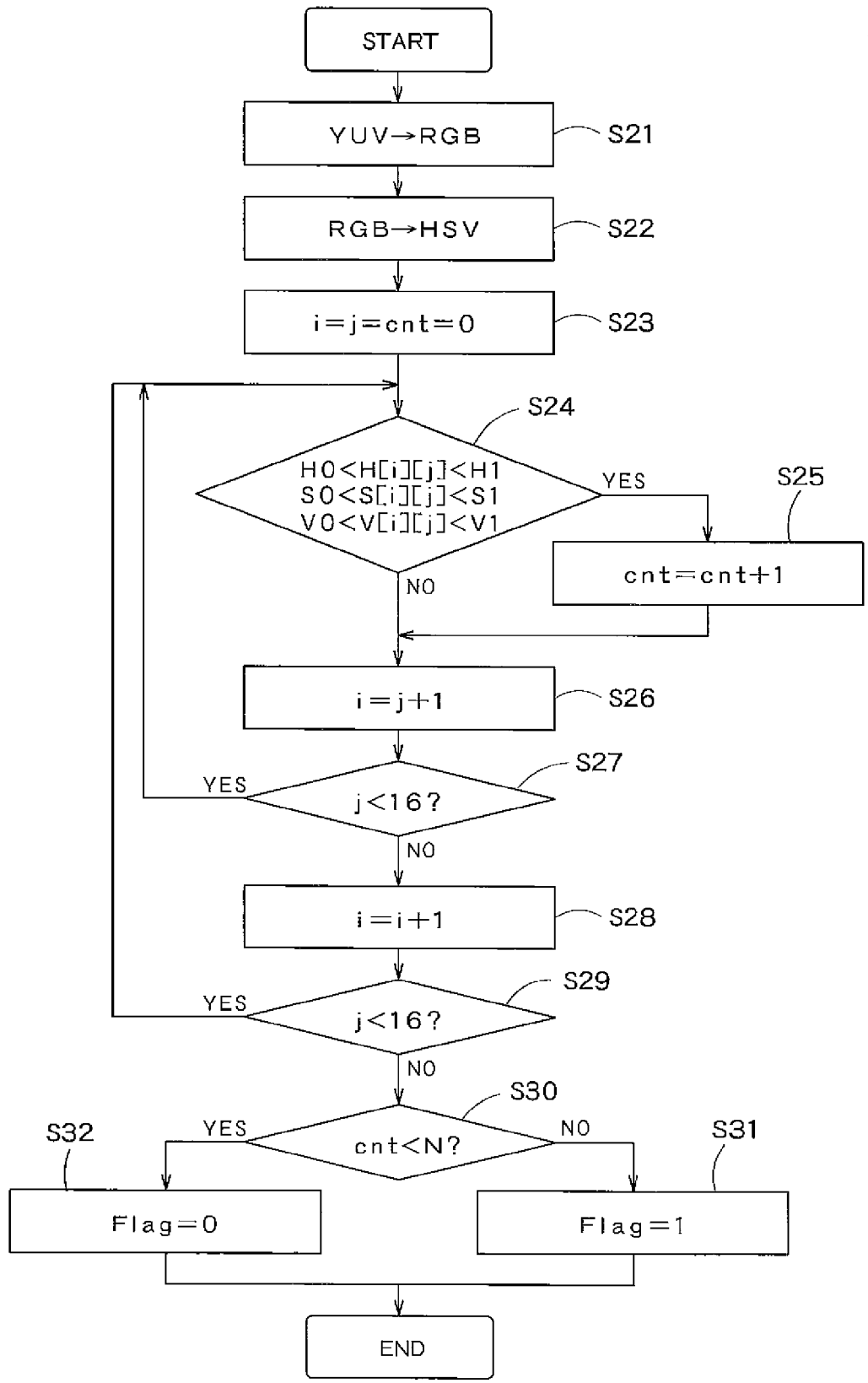
F I G. 3

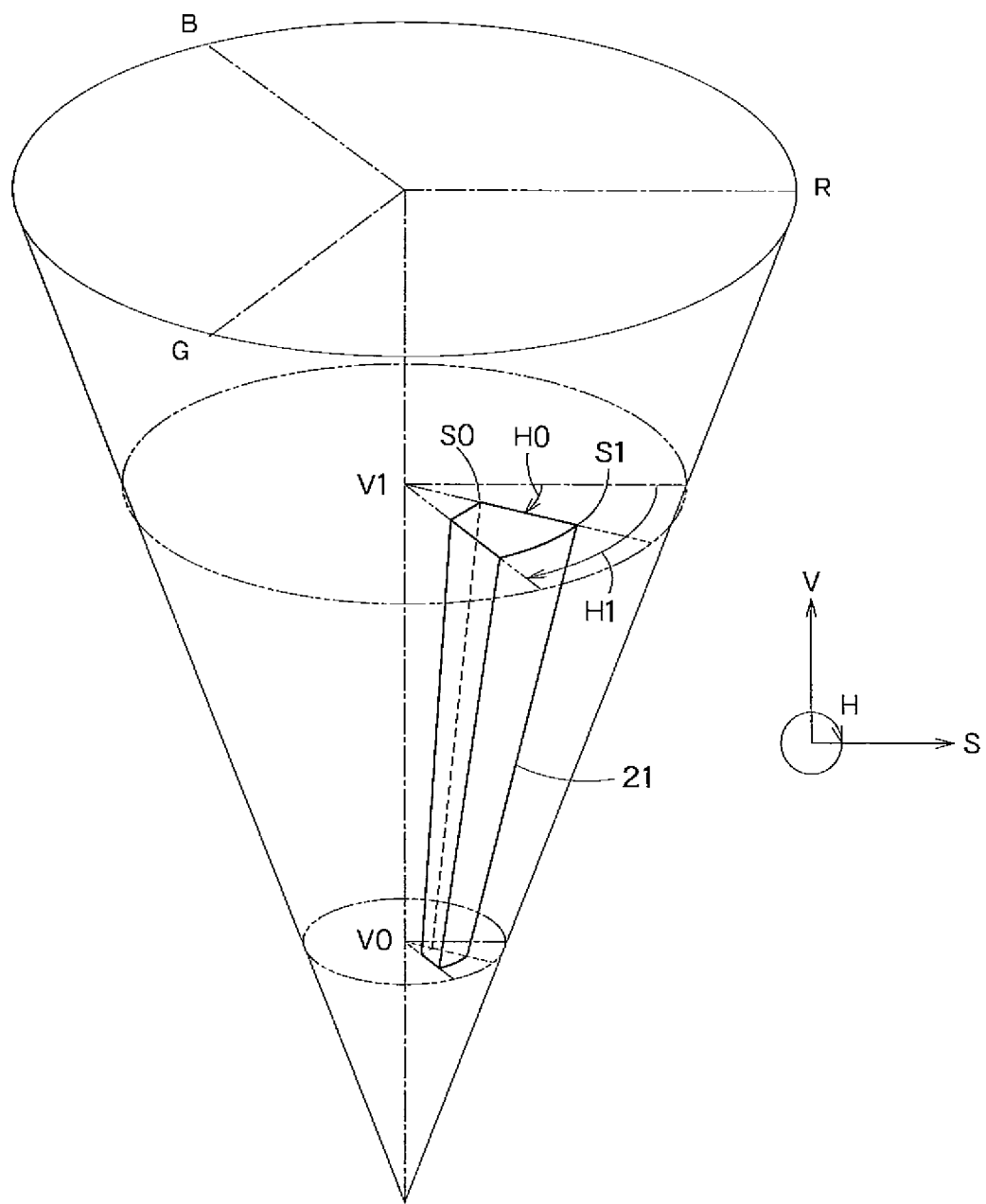
F I G. 4

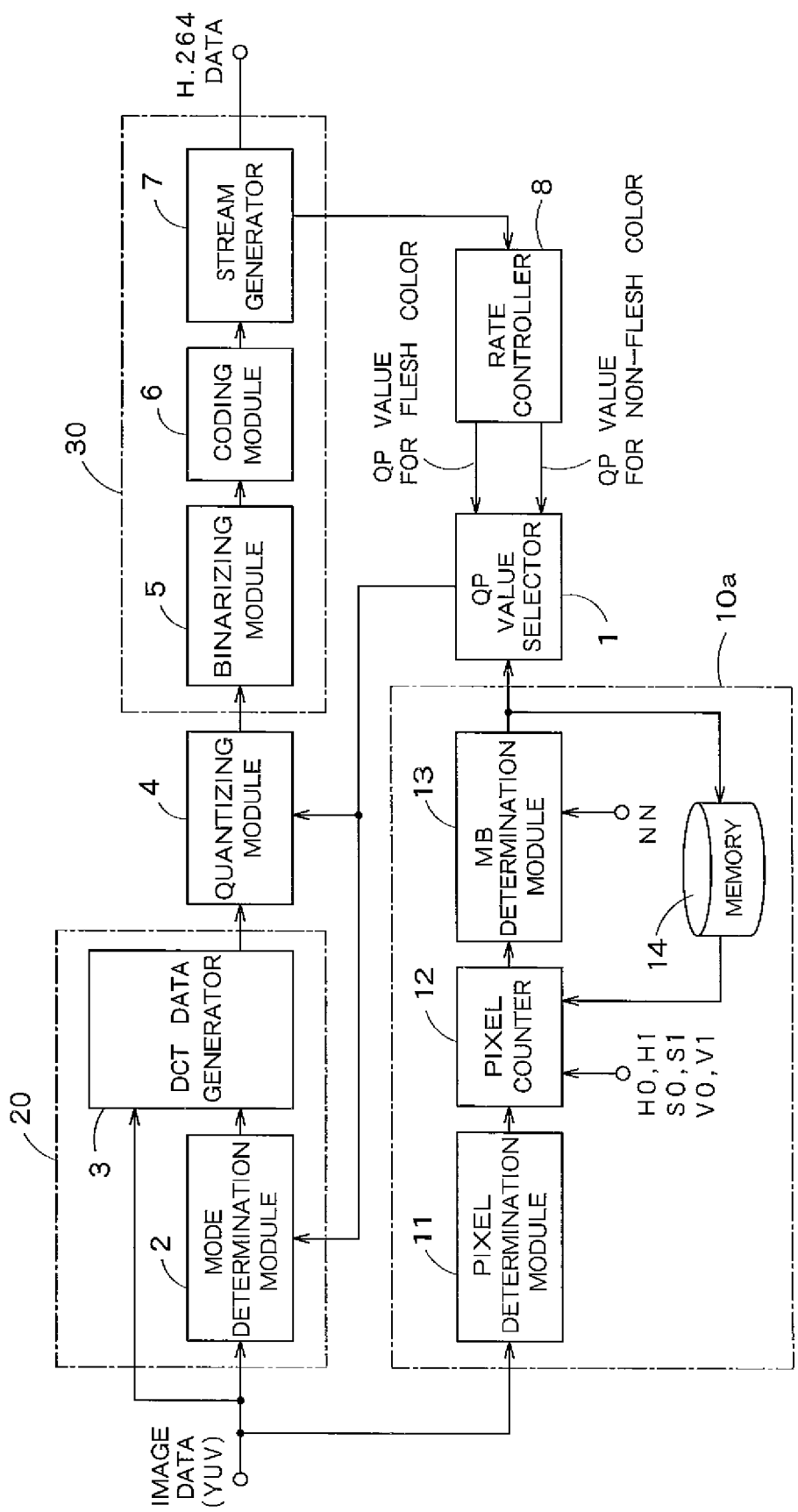
F I G. 5

MOVING IMAGE COMPRESSION-CODING DEVICE, METHOD OF COMPRESSION-CODING MOVING IMAGE, AND H.264 MOVING IMAGE COMPRESSION-CODING DEVICE

CROSS REFERENCE TO RELATED APPLICATIONS

This application is based upon and claims the benefit of priority from the prior Japanese Patent Applications No. 2009-53100, filed on Mar. 6, 2009, the entire contents of which are incorporated herein by reference.

BACKGROUND OF THE INVENTION

1. Field of the Invention

The invention relates to a moving image compression-coding device, a method of compression-coding moving image, and an H.264 moving image compression-coding device for compression-coding a moving image.

2. Related Art

As quality and resolution of a moving image get higher, a technique for compression-coding the moving image efficiently becomes inevitable. As a standard of compression-coding the moving image, a standard of an H.264 has been proposed (S. Okubo, "H.264/AVC kyokasyo", Impress Co., Ltd., Jul. 30, 2004, pp. 105-138).

There is a problem that a degradation of the image is highly visible when the amount of bits after compression is limited and a frame image is compression-coded with the same compression ratio in visually high sensitive area and the other area in the frame.

SUMMARY

According to one aspect of the present invention, a moving image compression-coding device comprising: a pixel determination module configured to determine whether a color of each pixel in a macro block having a plurality of pixels in an input image is a predetermined color; a pixel counter configured to count a number of the pixels having the predetermined color in the macro block; a macro block determination module configured to determine whether a color of the macro block is considered to be the predetermined color according to the count result; and a compression-coded data generator configured to compression-code the input image with a compression ratio depending on the determination result.

According to the other aspect of the present invention, a method of compression-coding moving image comprises: determining whether a color of each pixel in a macro block having a plurality of pixels in an input image is a predetermined color; counting a number of the pixels having the predetermined color in the macro block; determining whether a color of the macro block is considered to be the predetermined color according to the count result; and compression-coding the input image with a compression ratio depending on the determination result.

According to the other aspect of the present invention, an H.264 moving image compression-coding device comprising: a pixel determination module configured to determine whether the color of each pixel in a macro block having a plurality of pixels in an input image is a predetermined color; a pixel counter configured to count a number of the pixels having the predetermined color in the macro block; a macro block determination module configured to determine whether the color of the macro block is considered to be the predetermined color according to the count result; a quantization parameter selector configured to select a first quantization parameter when the color of the macro block is determined as the predetermined color and to select a second quantization parameter different from the first quantization parameter when the color of the macro block is not determined as the predetermined color; a differential data DCT transformer configured to generate DCT data by discrete-cosine-transforming differential data between a prediction image of the input image and the input image; a quantizing module configured to generate quantized data by rounding-up or rounding-down a result obtained by dividing the DCT data by the quantizing step depending on the first or second quantization parameter selected by the quantization parameter selector; a binarizing module configured to generate binarized data by binarizing the quantized data; a coding module configured to generate coded data by variable-length-coding or arithmetic-coding the binarized data; and a stream data generator configured to generate compression-coded H.264 stream data by adding syntax information defined in an H.264 standard to the coded data.

BRIEF DESCRIPTION OF THE DRAWINGS

FIG. 2 is a flowchart showing an example of a processing operation of the compression-coding device of FIG. 1.

FIG. 3 is a flowchart showing an example of processing operation of a flesh color detector 10.

FIG. 4 is a color space expressed by a hue H, a saturation S and a brightness V.

FIG. 5 is a block diagram showing a schematic configuration of a compression-coding device according to a second embodiment of the present invention.

FIG. 6 is a flowchart showing an example of a processing operation of the flesh color detector 10a.

DETAILED DESCRIPTION OF THE INVENTION

Hereinafter, moving image compression-coding devices, methods of compression-coding moving image, and H.264 moving image compression-coding devices according to embodiments of the present invention will be specifically explained with reference to accompanying drawings.

First Embodiment

Figure 1:
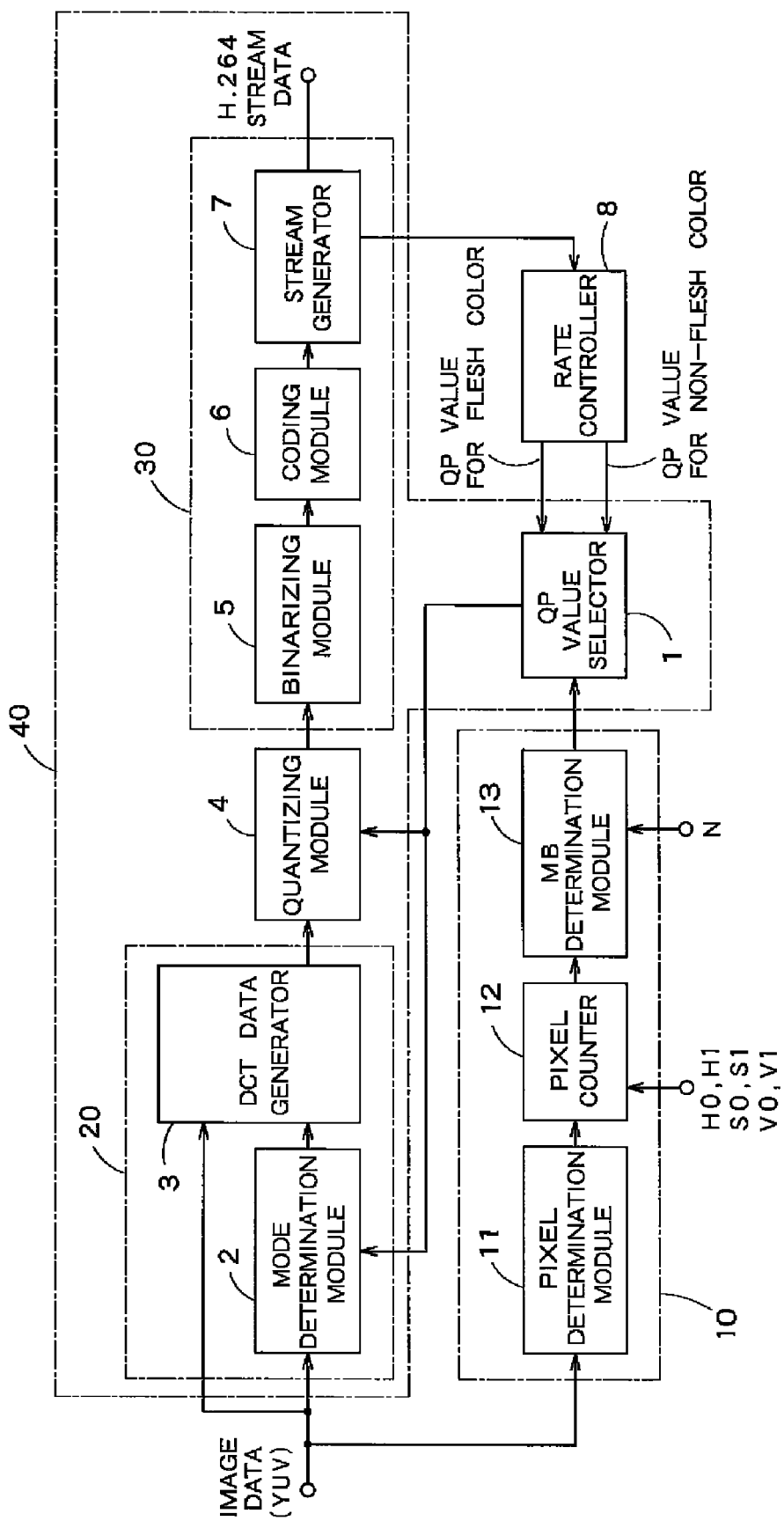
FIG. 1 is a block diagram showing a schematic configuration of a moving image compression-coding device according to a first embodiment of the present invention.

FIG. 1 is a block diagram showing a schematic configuration of a moving image compression-coding device (hereinafter, referred to as compression-coding device) according to a first embodiment of the present invention. The present embodiment shows an example where a moving image is compression-coded based on the H.264 standard. The compression-coding device has a flesh color detector 10, a quantization parameter (QP) value selector 1, a differential data orthogonal transformer 20, a quantizing module 4, a compression-coding module 30, and a rate controller 8. The flesh color detector 10 has a pixel determination module 11, a pixel counter 12, and a macro block (MB) determination module 13. The differential data orthogonal transformer 20 has a mode determination module 2 and a DCT data generator 3. The compression-coding module 30 has a binarizing module 5, a coding module 6, and a stream generator 7.

A compression-coded data generator 40 has the QP value selector 1, the quantizing module 4, the differential data orthogonal transformer 20, and the compression-coding module 30.

The compression-coding device of FIG. 1 can be integrated in a chip or can be separated into two or more chips. The compression-coding device according to the present embodiment is, for example, used for compression-coding a moving image taken by a digital video camera or compression-coding a broadcast wave to record it to a DVD recorder.

In the present embodiment, an example will be explained where image data having a luminance signal Y and color-difference signals U and V is inputted, and the signal Y, U and V are digital values of "8" bit with 4:4:4 format where the amounts of the data of the signal Y, U and V are the same. In the example, a size of a MB is "16" pixels in the horizontal and the vertical directions. Here, the MB is a unit of compression-coding and is composed of a plurality of pixels in a frame.

The pixel determination module 11 in the flesh color detector 10 determines whether or not each pixel in the MB has flesh color (predetermined color). The pixel counter 12 counts the number of flesh-colored pixels present in the MB. The MB determination module 13 determines whether or not the MB is considered as flesh-colored according to the count result.

The QP value selector 1 selects one of a QP value for flesh color (first QP value) and a QP value for non-flesh color (second QP value) based on the determination result of the MB determination module 13. Here, the QP value is a parameter corresponding to a compression ratio. As the QP value is larger, the compression ratio is higher.

The differential data orthogonal transformer 20 generates a prediction picture of the input image to orthogonally transform differential data between the input image and the prediction image. More specifically, the mode determination module 2 selects a prediction mode of intra frame coding or inter frame coding. Then, the DCT data generator 3 calculates differential data between the input image and the prediction image based on the selected prediction mode. Furthermore, the DCT data generator 3 generates DCT data (orthogonal transform data) by discrete-cosine-transforming (hereinafter, referred to as DCT) the differential data.

The quantizing module 4 generates quantized data by quantizing the DCT data based on the QP value selected by the QP value selector 1.

The compression-coding module 30 generates H.264 data by compression-coding the quantized data. More specifically, the binarizing module 5 generates binarized data by binarizing the quantized data. The coding module 6 generates coded data by variable-length-coding or arithmetic-coding the binarized data. The stream generator 7 outputs compression-coded H.264 stream data obtained by adding syntax information defined in the H.264 standard to the coded data. Furthermore, the stream generator 7 informs the rate controller 8 about the amount of the bits of the generated H.264 stream data. The rate controller 8 generates the QP values for flesh color and for non-flesh color to provide the generated QP values to the QP value selector 1.

In the present embodiment, the flesh color detector 10, the rate controller 8, and the QP value selector 1 are provided in the compression-coding device of FIG. 1. The QP value selector 1 switches the QP value by each MB depending on whether or not the MB has flesh color. Because of this, the compression-coding device of FIG. 1 switches the compression ratio in the frame, thereby compression-coding the flesh-colored parts with keeping high quality and the other parts with small amount of data.

FIG. 2 is a flowchart showing an example of a processing operation of the compression-coding device in FIG. 1. With reference to FIG. 2, the processing operation of the compression-coding device of FIG. 1 will be explained below.

Firstly, before starting compression-coding processing, the rate controller 8 generates the two QP values for flesh color and for non-flesh color to provide the generated QP values to the QP value selector 1 (Step S1), as described specifically below.

When compressing the image with constant bit rate (hereinafter, referred to as CBR), the rate controller 8 provides the QP value selector 1 with a predetermined QP value.

On the other hand, when compressing the image with variable bit rate (hereinafter, referred to as VBR), the rate controller 8 calculates the QP value according to the amount of the generated bits of the previously generated H.264 stream data to provide the calculated QP value to the QP value selector 1. A specific example will be described below.

The target bit rate of the H.264 stream data, which is compression-coded data, is set in the rate controller 8 in advance. With regard to the first frame, the rate controller 8 provides the QP value selector 1 with a predetermined QP value. With regard to the following frame, when the amount of the generated bits is larger than the target bit rate, the rate controller 8 updates the QP value so that the QP value gets larger (namely, the compression ratio gets higher). Contrarily, when the amount of the generated bits is smaller than the target bit rate, the rate controller 8 updates the QP value so that the QP value gets smaller (namely, the compression ratio gets lower). Then, the rate controller 8 provides the QP value selector 1 with the updated QP value.

Note that a frequency of updating the bit rate can be per a frame or can be per several frames. However, in a frame, the bit rate is not updated, and the QP value outputted by the rate controller 8 does not vary. Furthermore, the amount of the generated bits can be the amount of the H.264 stream data of the immediately preceding frame or can be an average bit rate of the several compression-coded frames or the like.

As the QP value is larger, the compression ratio is higher. Therefore, the QP value for non-flesh color is set larger than that for flesh color in the cases of both VBR and CBR.

Next, the flesh color detector 10 determines whether or not the MB to be compression-coded has flesh color by each MB. FIG. 3 is a flowchart showing an example of processing operation of the flesh color detector 10. With reference to the FIG. 3, the manner for detecting flesh color will be explained in detail.

Firstly, the pixel determination module 11 transforms the inputted luminance signal Y and color-difference signals U and V to color signals R (Red), G (Green) and B (Blue) (Step S21). The following equations (1) to (3) are used for the transform, for example.

$$R = Y + 1.140V \quad (1)$$

$$G = Y - 0.394U - 0.581V \quad (2)$$

$$B = Y + 2.032U \quad (3)$$

Then, the pixel determination module 11 transforms the color signals R, G and B to a hue H, the saturation S and the brightness V (Step S22). The following equations (4) to (6) are used for the transform, for example. Here, MAX and MIN are the maximum value and the minimum value of the color signals R, G and B, respectively.

$$H = 60*(B-G)/(MAX-MIN), \text{ (when } R \text{ is the maximum)} \quad (4)$$
$$= 60*(R-B)/(MAX-MIN)+120,$$
$$\text{(when } G \text{ is the maximum)}$$
$$= 60*(G-R)/(MAX-MIN)+240$$
$$\text{(when } B \text{ is the maximum)}$$

$$S = (MAX-MIN)/MAX \quad (5)$$

$$V = MAX \quad (6)$$

Note that when MAX=0, the saturation S is not defined. When the MAX=MIN, the hue H is not defined. In the equation (4), when the hue H is negative, the value added by "360" is defined to be the hue H.

FIG. 4 is a color space expressed by the hue H, the saturation S and the brightness V. The hue H expresses color. The hue H is an angle from "0" degree to "360" degree. The hue H of "0" degree, "120" degree and "240" degree correspond to red, green and blue, respectively. Here in FIG. 4, the angle is defined in clock rotation for convenience. The saturation S expresses color depth. The saturation S is a value from "0" to "1". As the saturation S is larger, the color is deeper. The brightness V expresses brightness. The brightness V is a value from "0" to "255". As the brightness V is larger, the color is brighter. The shape of the HSV color space expressed by the hue H, the saturation S and the brightness V is circular cone as shown in FIG. 4. The HSV space is closer to a visual sensation of human than a space expressed by the luminance signal Y and color-difference signals U and V or a space expressed by color signals R, G and B. Therefore, a specific color can be simply defined in the HSV space.

The pixel determination module 11 performs the processings of Steps S21 and S22 in each of "16*16=256" pixels in the MB.

Then, the pixel determination module 11 resets a horizontal pixel number i, a vertical pixel number j and a number cnt of flesh-colored pixels to be "0", respectively (Step S23). Hereinafter, the hue H, the saturation S and the brightness V of the horizontal pixel number i and the vertical pixel number j will be expressed as H[i][j], S[i][j] and V[i][j], respectively.

Next, the pixel determination module 11 determines whether or not the pixel of the horizontal pixel number i and the vertical pixel number j has flesh color based on H[i][j], S[i][j] and V[i][j]. More specifically, when all of following equations (7) to (9) are satisfied (Step S24), the pixel counter 12 increases the number cnt of flesh-colored pixels by "1" because the pixel can be considered as flesh color (Step S25).

$$H0 < H[i][j] < H1 \quad (7)$$

$$S0 < S[i][j] < S1 \quad (8)$$

$$V0 < V[i][j] < V1 \quad (9)$$

Here, H0, H1, S0, S1, V0 and V1 are values for defining the flesh color and are thresholds which are boundary lines for distinguishing the flesh color from the non-flesh color. Colors in an area surrounded by the boundary lines (area 21 of FIG. 4) are defined as the flesh color. In the equations (7) to (9), the hue H0 and H1 are set to be near yellow, and the saturation S0 and S1 and the brightness V0 and V1 are set to be approximately intermediate values between the minimum and maximum values.

If the flesh color is defined using the luminance signal Y and the color-difference signals U and V, or the color signals R, G and B, the definition of the flesh color is considerably complex. As a result, it takes a long time to perform the processing of determining whether or not the pixel has flesh color.

Contrarily, in the present embodiment, the pixel determination module 11 transforms the luminance signal Y and the color-difference signal U and V to the hue H, the saturation S and the brightness V. Because the HSV color space is close to the visual sensation of human, the flesh color can be simply defined as the equations (7) to (9) and the area 21 of FIG. 4. Therefore, the pixel determination module 11 can determine whether the pixel has flesh color in a short time.

The pixel determination module 11 and the pixel counter 12 perform the above processings in all the pixels in the MB (i, j=0 to 15, respectively) to count the number of flesh-colored pixels present in the MB (Steps S26 to S29).

When the number cnt of the flesh-colored pixels in the MB exceeds a predetermined threshold N (Step S30), the MB is determined as flesh color as a whole, and the MB determination module 13 sets a signal Flag to be high (Step S31). On the other hand, when the number cnt of the flesh-colored pixels in the MB does not exceed the threshold N, the MB is not determined as flesh color as a whole, and the MB determination module 13 sets a signal Flag to be low (Step S32).

The threshold N is, for example, set to be "128", which is half of the number of the pixels in the MB. When the value of the threshold N is small, the input image can be compression-coded with high quality because the number of MBs determined as flesh color becomes large. When the value of the threshold N is large, the amount of the compression-coded data can be decreased because the number of MBs determined as flesh color decreases.

As mentioned above, after the determination processing of whether the MB has flesh color (Step S3 of FIG. 2) is performed, the QP value selector 1 selects the QP value based on the determination result (Steps S4 and S5). That is, when the signal Flag indicative of the determination result is high, the QP value for flesh color is selected (Step S4), and when the signal Flag is low, the QP value for non-flesh color is selected (Step S5).

Then, the mode determination module 2 selects the prediction mode of intra frame coding and inter frame coding (Step S6). Hereinafter, a processing operation for selecting the prediction mode will be described specifically.

As the prediction mode of the intra frame coding, one of a vertical prediction mode, a horizontal prediction mode, an average prediction mode, and a plain prediction mode is selected, for example. In the vertical prediction mode, pixels in the vertical direction in the MB are predicted using values of "16" pixels located on the upper side of the MB to be compression-coded. In the horizontal prediction mode, pixels in the horizontal direction in the MB are predicted using values of "16" pixels located on the left side of the MB to be compression-coded. In the average prediction mode, all the pixels in the MB are predicted using values of "32" pixels located on the upper side and left side of the MB to be compression-code. In the plain prediction mode, pixels are predicted by interpolating "16" pixels located on the upper side of the MB and "16" pixels located on the left side of the MB in the diagonal direction. Note that the pixels located on the right side or down side of the MB cannot be used for the prediction because they are not inputted to the compression-coding device yet.

Furthermore, in the prediction mode of the inter frame coding, one of a block size of motion compensation, a moving vector, a direct mode and a weighted prediction or the like is selected.

Then, the optimum prediction mode is selected among candidates of the prediction modes of the intra frame prediction and the inter frame prediction, as will be described below.

In a case of high quality mode, namely, in the case unnecessary to perform the compression-coding process in real time and capable of mufti-pass encode, the processings of generating DCT data (Step S7) up to coding (Step S10), which will be explained below, are performed once on all the prediction modes. Secondly, the decoded image generator (not shown) generates a decoded image by inverse-transforming the coded image. The mode determination module 2 selects the prediction mode which minimizes a cost function C expressed by following equation (10).

$$C=SSD+\lambda MODE*GenBit \quad (10)$$

Here SSD is a sum of square difference between the image before the compression-coding and the decoded image by pixel. GenBit is a generated bit after compression-coding. λMODE is a Lagrange multiplier, for which following equation (11) can be used, for example.

$$\lambda MODE=a*2^{QP/3} \quad (11)$$

Here, QP is the QP value selected by the QP value selector 1, and "a" is a constant depending on types of the picture. "a=0.85" for I and P picture and "a=3.4" for B picture. As the QP value becomes larger, λMODE becomes larger, while GenBit becomes smaller because the compression ratio becomes higher. Under this condition, the mode determination module 2 selects the prediction mode minimizing the cost function C.

On the other hand, in a case of high speed mode, namely, where real time compression-coding is required and one-pass encode is performed, the mode determination module 2 selects the prediction mode minimizing the sum of absolute difference between the image before the compression-coding and the prediction image by a pixel. Note that in the high speed mode, the mode determination module 2 does not use the QP value.

Then, the DCT data generator 3 generates the prediction image based on the determined prediction mode and calculates differential data between the image before the compression-coding and the prediction image. Next, the DCT data generator 3 generates DCT data by discrete-cosine-transforming the differential data (Step S7). In such a manner, the redundant components in the MB can be removed. Here, other orthogonal transform can be performed instead of the DCT.

Then, the quantizing module 4 generates quantized data by rounding-up or rounding-down a result obtained by dividing the DCT data by a quantizing step to be an integer (Step S8). Here, the quantizing step is determined depending on the QP value. As the QP value is larger, the quantizing step is larger. That is, as the QP value is larger, the amount of the bits of the quantized data is smaller.

Because the QP value for flesh color is smaller than that for non-flesh color, the quantizing step also becomes small when the MB has flesh color. Therefore, the amount of the bits of the quantized data becomes large when the MB has flesh color. As a result, the MB having flesh color, where the degradation of the image is easily recognized, is compression-coded with keeping high quality. Contrarily, when the MB has non-flesh color, the amount of the bits of the quantized data becomes small. As a result, it is possible to decrease the data amount after compression-coding for MB having non-flesh color where the degradation of the image is not so easily recognized.

Then, the binarizing module 5 generates binarized data by binarizing the quantized data (Step S9). For example, when the quantized data is X, the binarized data is X bits of "1"s followed by one bit of "0" (Unary Binarization scheme). Other schemes such as Truncated Unary Binarization scheme can be used for binarization.

Furthermore, the coding module 6 generates coded data by variable-length-coding or arithmetic-coding the binarized data (Step S10). The variable-length-coding is a technique where a code with shorter bits is assigned to a value as occurrence frequency thereof is higher. The arithmetic-coding is a technique where the occurrence frequency is not fixed and the code is defined according to an occurrence probability varying with time adaptively, by which the data amount becomes further smaller.

The stream generator 7 outputs compression-coded H.264 stream data by adding syntax information defined in the H.264 standard to the coded data (Step S11).

By the above processings of Steps S2 to S11, the compression-coding of one MB is completed. The same processings in all the MB in the frame are performed.

After completing the compression-coding in one frame, the stream generator 7 informs the rate controller 8 about the amount of the bits of the generated H.264 stream data (Step S12). As mentioned above, the amount of the bits of the generated H.264 stream data is used by the rate controller 8 in order to calculate the QP value. Note that the stream generator 7 can inform the rate controller 8 about the amount of generated bits according to that of generated bits of several frames once per several frames. In the case of CBR, the processing of Step S12 can be omitted.

With above mentioned processing, the processing of the compression-coding of a frame is completed, and then the processing of the compression-coding of the following frame is performed.

As stated above, in the first embodiment, the QP value is switched depending on whether the MB has flesh color, and when the MB flesh-colored flesh color, the compression ratio is set to be low and when the MB has non-flesh color, the compression ratio is set to be high. Therefore, the compression-coding device according to the present embodiment can compression-code the MB having flesh color, where the degradation of the image is easily recognized, with keeping high quality. Additionally, the amount of the data of the MB having non flesh color after compression-coding, where the degradation of the image is not so easily recognized, can be decreased. As a result, the compression ratio can be increased with keeping the whole image high quality.

Second Embodiment

In the first embodiment, whether the MB has flesh color is determined based on only pixels in the MB. On the other hand, in a second embodiment, which will be explained below, the flesh color is determined in consideration of whether or not the neighboring compression-coded MB has flesh color.

FIG. 5 is a block diagram showing a schematic configuration of a compression-coding device according to the second embodiment of the present invention. In FIG. 5, components common to those of FIG. 1 have common reference numerals, respectively. Hereinafter, components different from FIG. 1 will be mainly described. In the compression-coding device, the internal configuration of the flesh color detector 10*a* is different from that of FIG. 1, and the other is similar as FIG. 1.

The flesh color detector 10*a* has a memory 14 in addition to the configuration of the flesh color detector 10 in FIG. 1. The memory 14 stores the determination result of whether or not the MB has flesh color. The memory 14 can store the determination result of (the number of MBs in the horizontal direction+1) the immediately preceding compression-coding. For example, when the number of pixels in the horizontal direction is "1920", the memory 14 can store "121" (=1920/16+1) determination results.

Figure 6:
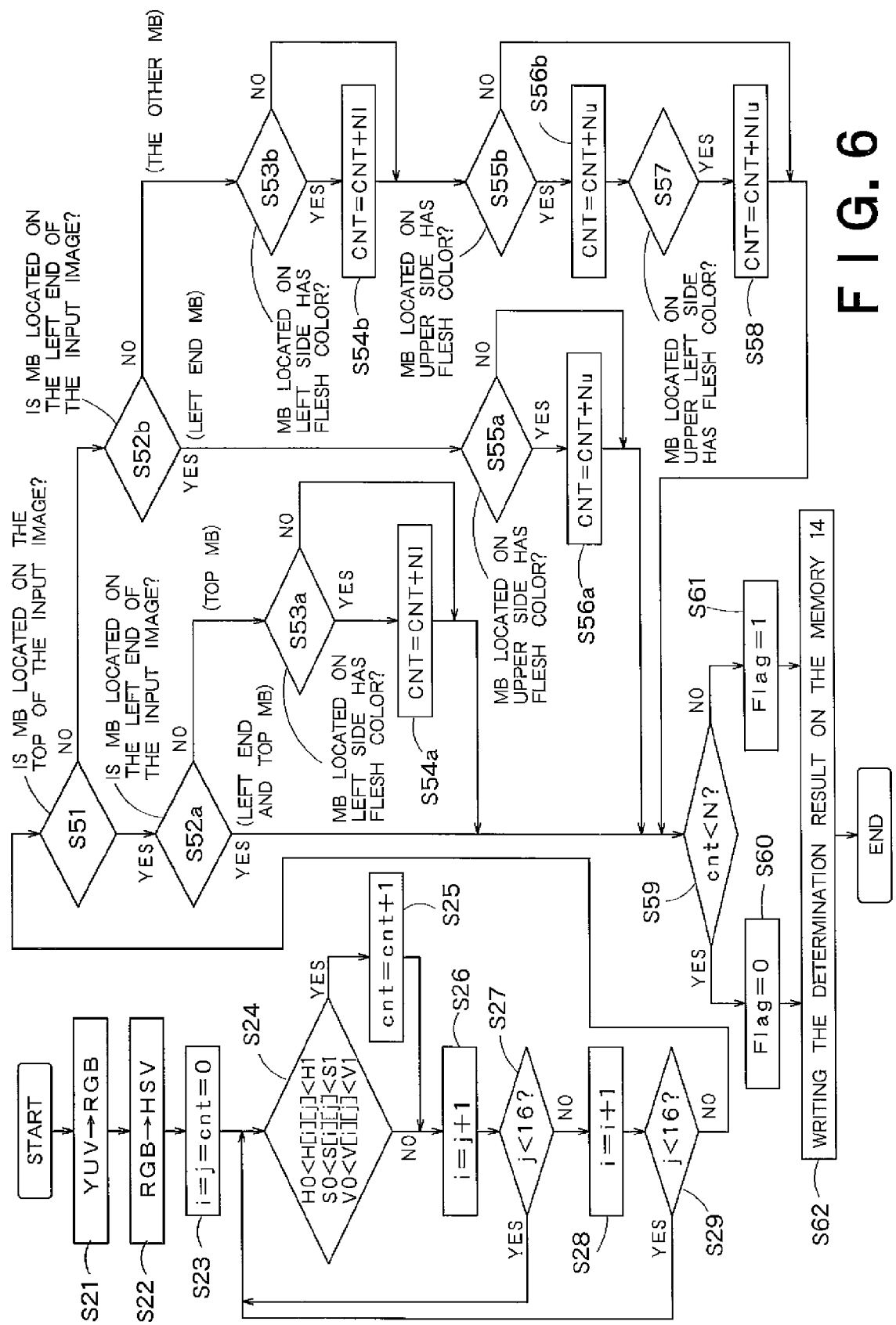

FIG. 6 is a flowchart showing an example of a processing operation of the flesh color detector 10*a*. The processings of Steps S21 to S29 are similar to FIG. 3. It is different from FIG. 3 that the MB determination module 13 writes the determination result of whether the MB has flesh color, on the memory 14 (Step S62) and that the MB determination module 13 determines whether the MB has flesh color in consideration of the determination results of the MBs located on the left side, upper side and upper left side of the MB to be compression-coded (Steps S51 to S61). An example will be specifically described below where there are H MBs in the horizontal direction and V MBs in the vertical direction. Hereinafter, MB of the p-th from the top and q-th from the left will be recited as MB(p, q).

With regard to the MB(0, 0) which is compression-coded firstly in the frame, whether the MB(0, 0) has flesh color is determined as well as FIG. 3 (Steps S21 to S29, S51-YES, S52*a*-YES and S59 to S61). Then, the MB determination module 13 writes the determination result on the memory 14 (Step S62).

With regard to the MB(0, 1) which is compression-coded after the MB(0, 0), the processings of Steps S21 to S29 are performed firstly. The location of the MB(0, 1) is the top end (Step S51-YES) but not the left end (Step S52*a*-NO). Therefore, the pixel counter 12 refers the determination result of the MB(0, 0) located on the left side of the MB(0, 1). When the MB(0, 0) is determined as flesh color (Step S53*a*-YES), the pixel counter 12 adds the number cnt of flesh-colored pixels by a constant NI (first constant) (Step 54*a*). Then, the MB determination module 13 performs the determination of whether the MB(0, 1) has flesh color (Steps S59 to S61) and writes the determination result on the memory 14 (Step S62).

The constant NI, and constants Nu (second constant) and NIu (third constant), which will be explained below, are predetermined values. The pixel counter 12 adds the number cnt of the flesh-colored pixels by these values. Because of this, the MB is determined as flesh color more easily.

The MB(0, 2) to MB(0, H−1), which are located on the top of the frame, are compression-coded as well. When the compression-coding of the MB(0, H−1) is completed, H determination results, namely, determination results of MB(0, 0) to the MB(0, H−1), are stored in the memory 14.

The MB(1, 0), which is compression-coded after the MB(0, H−1), is not located on the top end (Step S51-NO) but on the left end (Step S52*b*-YES). Therefore, the pixel counter 12 refers to the determination result of the MB(0, 0) located on the upper side of the MB(1, 0). When the MB(1, 0) is determined as flesh color (Step S55*a*-YES), the pixel counter 12 adds the number cnt of flesh-colored pixels by a constant Nu (Step S56*a*). Then, the MB determination module 13 performs the determination of whether the MB(1, 0) has flesh color (Steps S59 to S61) and writes the determination result on the memory 14 (Step S62). At this time, (H+1) determination results are stored in the memory 14.

The MB(1, 1), which is compression-coded after the MB(1, 0), is not located on the top end (Step S51-NO) nor left end (Step S52*b*-NO). Therefore, the pixel counter 12 refers to the determination results of the MB(1, 0), the MB(0, 1) and the MB(0, 0) located on the left side, upper side, and upper left side of the MB(1, 1), respectively. When the MB(1, 0), the MB(0, 1) and the MB(0, 0) are determined as flesh color, the pixel counter 12 adds the number cnt of flesh-colored pixels by the constants NI, Nu and NIu, respectively (Steps S53*b* to S58). Then, the MB determination module 13 performs the determination of whether the MB(1, 1) has flesh color (Steps S59 to S61) and writes the determination result on the memory 14 (Step S62). At this time, the determination result of the MB(0, 0) stored in the memory 14 the earliest is deleted.

The other MBs are compression-coded as well. As mentioned above, when the MB(1, 1) and the subsequent MBs are compression-coded, the memory 14 stores (H+1) determination results. With regard to the MBs (0, q) (where q=1 to H−1) which are located on the top end but not the left end of the frame, the pixel counter 12 adds the number cnt of the flesh-colored pixels by the constant NI according to the determination result of the MB(0, q−1) located on the left side of the MB(0, q). With regard to the MBs (p, 0) (where p=1 to V−1) which are located on the left end but not the top end of the frame, the pixel counter 12 adds the number cnt of the flesh-colored pixels by the constant Nu according to the determination result of the MB(p−1, 0) located on the upper side of the MB(0, q). With regard to the MBs (p, q) (where p=1 to V−1 and q=1 to H−1) which are not located on the top end nor the left end of the frame, the pixel counter 12 adds the number cnt of the flesh-colored pixels by the constants NI, Nu and NIu according to the determination results of the MB(p, q−1), MB(p−1, q) and MB(p−1, q−1) located on the left side, upper side, and upper left of the MB(p, q), respectively.

Thus, by referring to and compression-coding the determination results of the neighboring MBs, effects below will be obtained.

When the neighboring MBs have flesh color, it is a high possibility that the MB to be compression-coded has also flesh color. However, in the MB to be determined as flesh color may include some pixels which do not satisfy the equations (7) to (9), and therefore, the number cnt of the flesh-colored pixels may not exceed the threshold N slightly.

In the present embodiment, when the neighboring MB has flesh color, the pixel counter 12 adds the number cnt of the flesh-colored pixels by the constant NI or the like. Therefore, when the added number cnt of the flesh-colored pixels exceeds the threshold N, the MB is determined as flesh color. By such a manner, even if the number cnt of the flesh-colored pixels present only in the MB does not exceed the threshold N, such MB can be determined as flesh color more easily, thereby compression-coding the MB which has approximately flesh color with keeping high quality.

Furthermore, the MB on a border between a face and the background has both of flesh-colored and non-flesh-colored pixels, for example. In this case, the neighboring MBs, which are flesh-colored parts, are compression-coded with keeping high quality. On the other hand, the MB on the border has both of flesh-colored and non-flesh-colored pixels. Therefore, if the neighboring MBs are not referred to, the MB on the border is determined as non-flesh-colored as a whole and may be compression-coded with high compression ratio. In the first embodiment, the compression ratio of the MB on the border becomes high, and further, difference of the compression ratios between the neighboring MBs and the MB on the border becomes large. Therefore, there is a likelihood that a degradation of flesh-colored part is highly visible.

In the present embodiment, when the neighboring MB has flesh color, even if the MB has both of flesh-colored and non-flesh-colored pixels, the MB is determined as flesh color more easily. Therefore, the MB on the border between flesh color and non-flesh color can be also compression-coded with keeping high quality.

Furthermore, in the present embodiment, the pixel counter 12 refers to the MB located on only the left side, upper side and upper left side of the MB among the neighboring MBs, but does not refer to the MB on right side, lower side and lower right side of the MB. This is because the image data is inputted from the left side to the right side of the frame and the top to the bottom of the frame respectively and the flesh color determinations are completed on the MB located only on the left side, upper side and upper left side of the MB. In order to refer to the MB on right side, lower side and lower right side of the MB, firstly the flesh color determinations of all the MBs are once performed, then the memory 14 stores all the determination results, and a processing of another flesh color determination referring to the determination results is performed, for example. As a result, extremely large memory for storing the determination results of all the MBs is necessary. Furthermore, the image data cannot be compression-coded on real time.

In the present embodiment, the mode determination module 2 refers to only the determination results of the MBs located on the left side, upper side and upper left side of the MB, of which the flesh color determinations have been completed. Therefore, the scale of the memory 14 can be decreased, and a moving image can be compression-coded on real time using hardware.

Note that the memory 14 may store at least one result of the flesh color determination. For example, the memory 14 may store the determination result of the left side MB, and the pixel counter 12 may refer to only the left side MB. By such a manner, the scale of the memory 14 can be further decreased.

As stated above, in the second embodiment, the flesh color determination is performed referring to the neighboring MBs. Therefore, the MB having flesh color can be detected more precisely than the first embodiment, thereby compression-coding the flesh-colored part surely with keeping high quality.

In each of above described embodiments, 4:4:4 format is used in the image data. However, 4:2:2 format and 4:2:0 format can be also used. Here, in the case of 4:2:2 format, the amount of the data of the color-difference signals U and V in the horizontal direction is half of that of the luminance signal Y, and in the case of 4:2:0 format, the amount of the data of the color-difference signals U and V in the horizontal and vertical direction is half of that of the luminance signal Y. In this case, a color-difference interpolator can be provided to perform interpolation of the color-difference signals U and V.

Instead of the flesh color detector 10 (or 10*a*), a specific color detector is provided and the specific color detector can detect a color except flesh color (e.g. green) where the degradation of the image is easily recognized. Furthermore, the specific color detector can detect a color where it is difficult to recognize the degradation of the image, and when the MB is determined as the color, the compression ratio can be heightened. In addition, multiple specific color detectors can be provided and detect multiple colors to control the QP value.

In each of above described embodiments, the pixel determination module 11 transforms the luminance signal Y, and the color-difference signals U and V to the values of the phase, the saturation and the brightness, and determines the pixel as flesh color when the values of the phase, the saturation and the brightness are in the predetermined range, respectively. The pixel determination module 11 can determine whether the pixels has flesh color based on the luminance signal Y, the color-difference signals U and V or the color signals R, G and B.

In each of above described embodiments, an example has been described where the compression-coding is performed based on the H.264 standard. However, the present invention can be applicable when the compression-coded data is generated by compression-coding the moving image based on the other standard such as MPEG.

At least a part of the compression-coding device explained in the above embodiments can be formed of hardware or software. When the compression-coding device is partially formed of the software, it is possible to store a program implementing at least a partial function of the compression-coding device in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the compression-coding device can be distributed through a communication line (including radio communication) such as the Internet etc. Furthermore, the program which is encrypted, modulated, or compressed can be distributed through a wired line or a radio link such as the Internet etc. or through the recording medium storing the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A moving image compression-coding device comprising:
   a pixel determination module configured to determine whether a color of each pixel in a macro block having a plurality of pixels in an input image is a predetermined color;
   a memory configured to store a determination result of whether the color of the each macro block is considered as the predetermined color;
   a pixel counter configured to count a number of the pixels having the predetermined color in the macro block and:
   add the count result by a first constant according to the determination result of whether the color of the macro block located on the left side of the macro block to be determined is considered as the predetermined color when the macro block to be determined is located on a top end but not a left end in a frame of the input image;
   add the count result by a second constant according to the determination result of whether the color of the macro block located on the upper side of the macro block to be determined is considered as the predetermined color when the macro block to be compression-coded is located on the left end but not the top end in the frame of the input image; and
   add the count result by the first constant according to the determination result of whether the color of the macro block located on the left side of the macro block to be determined is considered as the predetermined color, add the count result by the second constant according to the determination result of whether the macro block located on the upper side of the macro block to be determined is considered as the predetermined color, and add the count result by a third constant according to the determination result of whether the macro block located on the upper left side of the macro block to be determined is considered as the predetermined color, when the macro block to be determined is located on neither the left end nor the top end in the frame of the input image;

a macro block determination module configured to determine whether a color of the macro block is considered to be the predetermined color according to the count result in consideration of whether a macro block which is located near the macro block to be determined and has already been compression-coded is considered as the predetermined color; and a compression-coded data generator configured to compression-code the input image with a compression ratio depending on the determination result.

2. The device of claim 1, wherein the compression-coded data generator comprises:

a quantization parameter selector configured to select a first quantization parameter when the color of the macro block is determined as the predetermined color and to select a second quantization parameter different from the first quantization parameter when the color of the macro block is not determined as the predetermined color;

a differential data orthogonal transformer configured to generate orthogonal transform data by orthogonal-transforming differential data between a prediction image of the input image and the input image;

a quantizing module configured to generate quantized data by quantizing the orthogonal transform data by the quantizing step depending on the first or second quantization parameter selected by the quantization parameter selector; and a compression-coding module configured to compression-code the quantized data.

3. The device of claim 2, wherein the predetermined color is a color where a degradation of the image is easily recognized, and the quantizing step depending on the first quantized parameter is smaller than the quantized parameter depending on the second quantized parameter.

4. A moving image compression-coding device comprising:

a pixel determination module configured to determine whether a color of each pixel in a macro block having a plurality of pixels in an input image is a predetermined color, the signal corresponding to the input image having a luminance signal Y, and color-difference signals U and V, the pixel determination module calculating first to third color signals R, G and B based on the luminance signal Y, and the color-difference signals U and V, and transforming the first to third color signals R, G and B to the phase value, the saturation value and the brightness value based on following equations (1) to (3), $$H = 60 * (B - G)/(\text{MAX} - \text{MIN}), \text{ (when } R \text{ is the maximum)} \quad (1)$$
$$= 60 * (R - B)/(\text{MAX} - \text{MIN}) + 120,$$
(when $G$ is the maximum)
$$= 60 * (G - R)/(\text{MAX} - \text{MIN}) + 240$$
(when $B$ is the maximum)

$$S = (\text{MAX} - \text{MIN})/\text{MAX} \quad (2)$$

$$V = \text{MAX}, \quad (3)$$

where the MAX is a maximum value among the first to the third color signals R, G and B, and the MIN is a minimum value among the first to the third color signals R, G and B, and when the phase value, the saturation value and the brightness value are in predetermined ranges, respectively, the pixel determination module determines the color of the pixel as the predetermined color;

a pixel counter configured to count a number of the pixels having the predetermined color in the macro block;

a macro block determination module configured to determine whether the color of the macro block is considered to be the predetermined color according to the count result; and a compression-coded data generator configured to compression-code the input image with a compression ratio depending on the determination result.

5. A method of compression-coding moving image comprises:

determining whether a color of each pixel in a macro block having a plurality of pixels in an input image is a predetermined color;

storing a determination result of whether the color of the each macro block is considered as the predetermined color;

counting a number of the pixels having the predetermined color in the macro block and;

adding the count result by a first constant according to the determination result of whether the color of the macro block located on the left side of the macro block to be determined is considered as the predetermined color when the macro block to be determined is located on a top end but not a left end in a frame of the input image;

adding the count result by a second constant according to the determination result of whether the color of the macro block located on the upper side of the macro block to be determined is considered as the determined color when the macro block to be compression-coded is located on the left end but not the top end in the frame of the input image; and adding the count result by the first constant according to the determination result of whether the color of the macro block located on the left side of the macro block to be determined is considered as the determined color, add the count result by the second constant according to the determination result of whether the macro block located on the upper side of the macro block to be determined is considered as the predetermined color, and add the count result by a third constant according to the determination result of whether the macro block located on the upper left side of the macro block to be determined is considered as the predetermined color, when the macro block to be determined is located on neither the left end nor the top end in the frame of the input image;

determining whether a color of the macro block is considered to be the predetermined color according to the count result in consideration of whether a macro block which is located near the macro block to be determined and has already been compression-coded is considered as the predetermined color; and compression-coding the input image with a compression ratio depending on the determination result.

6. The method of claim 5, wherein upon generating the compression-coded data comprises:
selecting a first quantization parameter when the color of the macro block is determined as the predetermined color and to select a second quantization parameter different from the first quantization parameter when the color of the macro block is not determined as the predetermined color;
generating orthogonal transform data by orthogonal-transforming differential data between a prediction image of the input image and the input image;
generating quantized data by quantizing the orthogonal transform data by the quantizing step depending on the first or second quantization parameter selected by the quantization parameter selector; and
compression-coding data by compression-coding the quantized data.

7. The method of claim 6, wherein the predetermined color is a color where a degradation of the image is easily recognized, and
the quantizing step depending on the first quantized parameter is smaller than the quantized parameter depending on the second quantized parameter.

8. A moving image compression-coding method, comprising:
determining whether a color of each pixel in a macro block having a plurality of pixels in an input image is a predetermined color, the signal corresponding to the input image having a luminance signal Y, and color-difference signals U and V, first to third color signals R, G and B being calculated based on the luminance signal Y, and the color-difference signals U and V, and the first to third color signals R, G and B being transformed to the phase value, the saturation value and the brightness value based on following equations (1) to (3), $$H = 60*(B-G)/(MAX-MIN), \text{ (when } R \text{ is the maximum)} \quad (1)$$
$$= 60*(R-B)/(MAX-MIN)+120,$$
$$\text{(when } G \text{ is the maximum)}$$
$$= 60*(G-R)/(MAX-MIN)+240$$
$$\text{(when } B \text{ is the maximum)}$$
$$S = (MAX-MIN)/MAX \quad (2)$$
$$V = MAX, \quad (3)$$

where the MAX is a maximum value among the first to the third color signals R, G and B, and the MIN is a minimum value among the first to the third color signals R, G and B, and
the color of the pixel being determined as the predetermined color when the phase value, the saturation value and the brightness value are in predetermined ranges, respectively;
counting a number of the pixels having the predetermined color in the macro block;
determining whether the color of the macro block is considered to be the predetermined color according to the count result; and
compression-coding the input image with a compression ratio depending on the determination result.

9. An H.264 moving image compression-coding device comprising:
a pixel determination module configured to determine whether the color of each pixel in a macro block having a plurality of pixels in an input image is a predetermined color;
a memory configured to store a determination result of whether the color of the each macro block is considered as the predetermined color;
a pixel counter configured to count a number of the pixels having the predetermined color in the macro block and:
add the count result by a first constant according to the determination result of whether the color of the macro block located on the left side of the macro block to be determined is considered as the predetermined color when the macro block to be determined is located on a top end but not a left end in a frame of the input image;
add the count result by a second constant according to the determination result of whether the color of the macro block located on the upper side of the macro block to be determined is considered as the predetermined color when the macro block to be compression-coded is located on the left end but not the top end in the frame of the input image; and
add the count result by the first constant according to the determination result of whether the color of the macro block located on the left side of the macro block to be determined is considered as the predetermined color, add the count result by the second constant according to the determination result of whether the macro block located on the upper side of the macro block to be determined is considered as the predetermined color, and add the count result by a third constant according to the determination result of whether the macro block located on the upper left side of the macro block to be determined is considered as the predetermined color, when the macro block to be determined is located on neither the left end nor the top end in the frame of the input image;
a macro block determination module configured to determine whether the color of the macro block is considered to be the predetermined color according to the count result in consideration of whether a macro block which is located near the macro block to be determined and has already been compression-coded is considered as the predetermined color;
a quantization parameter selector configured to select a first quantization parameter when the color of the macro block is determined as the predetermined color and to select a second quantization parameter different from the first quantization parameter when the color of the macro block is not determined as the predetermined color;
a differential data DCT transformer configured to generate DCT data by discrete-cosine-transforming differential data between a prediction image of the input image and the input image;
a quantizing module configured to generate quantized data by rounding-up or rounding-down a result obtained by dividing the DCT data by the quantizing step depending on the first or second quantization parameter selected by the quantization parameter selector;
a binarizing module configured to generate binarized data by binarizing the quantized data;
a coding module configured to generate coded data by variable-length-coding or arithmetic-coding the binarized data; and
a stream data generator configured to generate compression-coded H.264 stream data by adding syntax information defined in an H.264 standard to the coded data.

* * * * *